July 16, 1957 R. R. FLORAC 2,799,775

SUPERREGENERATIVE RECEIVER WITH NON-LINEAR ELEMENT IN TUNED CIRCUIT

Filed March 1, 1955

INVENTOR
Richard R. Florac
BY
Curtis, Morris + Safford
ATTORNEYS

United States Patent Office 2,799,775

Patented July 16, 1957

2,799,775

SUPERREGENERATIVE RECEIVER WITH NON-LINEAR ELEMENT IN TUNED CIRCUIT

Richard R. Florac, New York, N. Y.

Application March 1, 1955, Serial No. 491,314

6 Claims. (Cl. 250—20)

Figure 1:
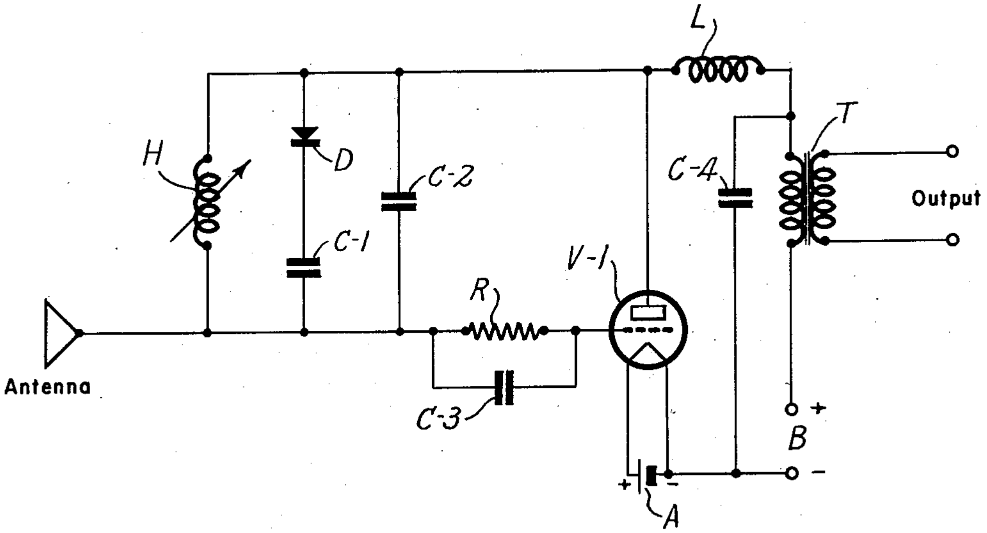

This invention is based upon the discovery that the insertion of a non-reciprocal conductive element at appropriate points in a radio-frequency circuit, especially a high frequency superregenerative radio receiver, greatly improves the performance of the circuit, e. g. greatly increases the output volume.

In vest pocket radio receivers and the like it is essential to obtain the utmost efficiency in station reception from the fewest, smallest and least expensive possible components since the market attraction of these receivers depends largely on their lightness, compactness, cheapness and low-cost operation.

The development of the regenerative circuit, and later the superregenerative circuit, were very big steps in making radio reception more efficient. These developments made possible the combined detection, amplification and de-modulation of a radio signal by a low-drain one-tube circuit with performance very nearly equal to that of a receiver having three or more tubes. In fact, the superregenerative circuit is so sensitive that for many years it has been believed to be either impossible or impractical to improve the sensitivity further. However it has now been found that further improvement is possible.

One possible disadvantage of a superregenerative circuit under certain circumstances is that, in the process of detecting and de-modulating an incoming signal, it radiates radio-frequency signals which can cause serious interference with the ordinary reception by other receivers. Unless special precautions are taken, the signals radiated sometimes become so severe that they block entirely any useful reception by other receivers. According to another aspect of this invention the undesirable radiation of interfering signals by a receiver can be almost entirely eliminated in a simple and inexpensive way.

In accordance with the present invention, in one specific embodiment thereof, the performance of a superregenerative receiver is noticeably improved by inserting a non-reciprocal conducting element into a part of the receiver circuit conducting radio-frequency currents. An effect of adding this element is an increase in gain of something like 10 db. Moreover it appears that this order of improvement can be obtained even though the non-reciprocal element is added at any one of a number of different points in the circuit. Further, putting this element in circuit with the receiver antenna, re-radiation of interfering signals from the receiver can be greatly reduced in adition to the increase in gain obtained. A preferred non-reciprocal element for this use is a high back-resistance crystal diode made of semi-conductive material such as germanium. Such diodes are readily available at low cost and can be obtained in very small sizes. Moreover, they are rugged and remain effectively constant in electrical characteristics over a wide range of conditions. This invention makes possible the utilization of one of these diodes, with all the concomitant advantages of simplicity of circuit design, miniature size, no additional power requirements and low cost, to obtain receiver performance equivalent to adding an additional stage of amplification.

Figure 2:
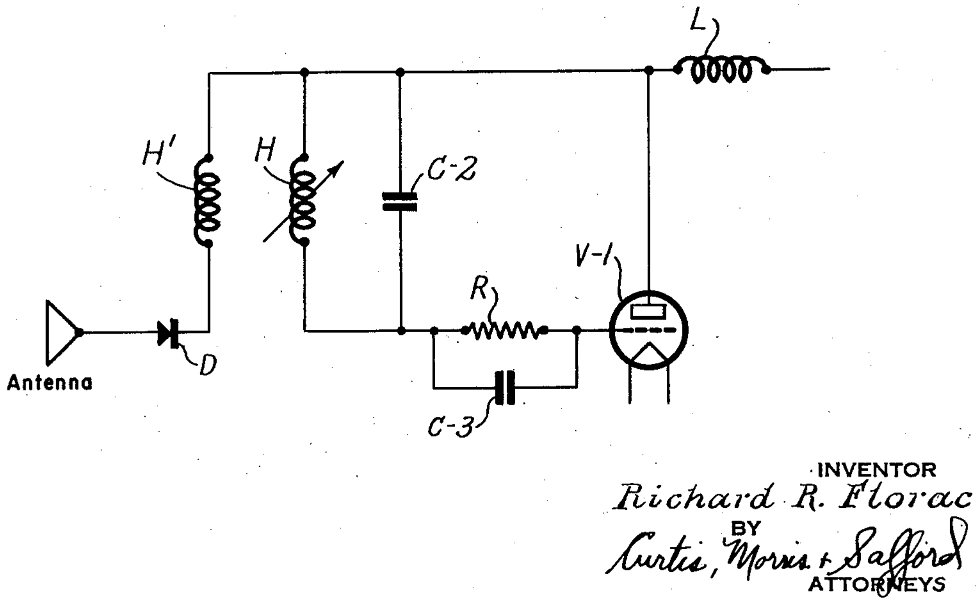

A better understanding of the nature of the invention together with a fuller appreciation of its many advantages will best be gained from a study of the following description given in connection with the accompanying drawings in which:

Figure 1 is the schematic circuit diagram of a superregenerative receiver embodying features of the present invention; and Figure 2 is the schematic circuit diagram of a receiver similar to that shown in Figure 1 arranged to suppress radiation of signals from the receiver.

Referring now particularly to Figure 1, the circuit shown therein, except for diode D and its coupling condenser C–1, is a conventional superregenerative circuit well known to the art. Coil H, which can be varied in inductance by some suitable means, such as a movable core element, resonates with condenser C–2, and these elements in parallel are electrically connected across the plate and grid of tube V–1. Grid resistor R, and condenser C–3 shunting it, determine the frequency at which tube V–1 is quenched. The audio output from the circuit is obtained through transformer T whose primary is connected at one end by a radio-frequency choke L to the plate of tube V–1 and at the other end to the positive side of a suitable power supply B. Any radio-frequency signals which pass through choke L are kept out of transformer T and shunted to ground through a by-pass condenser C–4. Current for heating the filament of tube V–1 is supplied by a suitable power supply A. An antenna is connected to the junction between coil H and resistor R.

A crystal diode D is connected in shunt across coil H by means of a small coupling capacitor C–1. This capacitor is advantageously the stray wiring capacitance between one end of diode D and the antenna wire leading from coil H. The use of capacitance in this form simplifies the assembly of the circuit and contributes to its low cost and small size. Diode D should have high back resistance to operate properly but apparently it is immaterail whether its plate or cathode is connected to coil H or to which end of the coil it is connected so long as capacitor C–1 is in series with it. The addition of this diode greatly improves the performance of the circuit, producing a remarkable increase in output volume.

In one particular embodiment of this circuit which has been built and tested, tube V–1 was a Raytheon type 5676 (triode-connected), R was 2.2 million ohms, C–3 was 100 $\mu\mu$f., C–2 was 4 $\mu\mu$f., C–1 was 1 to 3 $\mu\mu$f., diode D was a type IN54A germanium diode, coil H was approximately 4 turns of wire on a 3/8 inch diameter form with an adjustable "slug" to tune from 88 to 108 megacycles, and the antenna was a piece of wire about 3 inches long.

Figure 2 shows a modification of the superregenerative receiver of Figure 1 wherein, according to the invention, radiation of unwanted signals from the receiver antenna is virtualy eliminated. In this arrangement, wherein similar elements are identified by the same reference symbols used in Figure 1, the antenna is coupled by the diode D to a coil H' which is inductively coupled in the usual way to the main tuning coil H. This arrangement is particularly useful when the receiver is enclosed in a shielded box so that the effects of body capacitance and like de-tuning effects can be eliminated along with radiation from parts of the circuit other than the antenna. Thus a receiver of great stability and high output with little, if any, radiation of unwanted signals is easily obtained. Diode D can be connected in this arrangement in either polarity, or it can be connected in shunt with coil H' by means of a coupling capacitor in a manner analogous to that of Figure 1. It also can be connected between the antenna and one end of coil H in the event that coil H' is omitted. This application is the parent of co-pending divisional application Serial No. 622,189, filed November 14, 1956.

The above description is intended in illustration and not in limitation. Changes and modifications of the embodiments shown may occur to those skilled in the art and these can be made without departing from the spirit or scope of the invention as set forth.

I claim:

1. A radio-frequency circuit comprising a device for electronically amplifying radio-frequency signals, said device having an input and an output, a tuned circuit connected to said device and adapted to resonate at a radio-frequency, and means for increasing the amplification of said device, said means including a non-reciprocal conductive element connected in parallel with said tuned circuit, said element having a much higher resistance to current flow in one direction than in the other, said element being connected to said tuned circuit by means of a circuit having high resistance but low reactance to current flow at said radio-frequency.

2. The combination of elements as in claim 1 in which said non-reciprocal element is a diode which is connected to said tuned circuit by means of a small coupling capacitor.

3. A radio-frequency amplifying circuit comprising an oscillating stage having an input and an output, a tuned circuit including an inductor and a capacitor adapted to resonate at a high radio-frequency and connected at least in part between said input and ouput whereby said stage is self-oscillating, a radio-frequency signal input circuit connected to said amplifying circuit, and means to improve the performance of said amplifying circuit comprising a non-reciprocal current conducting element connected to said tuned circuit, said element being a single semi-conductive crystal connected in parallel relation with said inductor by means of a series coupling capacitance.

4. The combination of elements as in claim 3 in which said diode is a semi-conductive crystalline element of germanium and is connected in parallel relation with said tuned circuit by means of a coupling capacitance of roughly 1 to 3 micro-microfarads.

5. A super-regenerative receiver for radio signals comprising an electronic amplifying device having a first, a second and a third electrode, a tuned circuit connected at one end to said first electrode and including an inductance winding and a tank capacitor connected in parallel with at least part of said winding, self-quenching means connected at least in part in series with said tuned circuit and said second electrode, an antenna electrically coupled to said tuned circuit, and means for improving the performance of said receiver including a crystal diode and a small capacitor in series, the two in series being connected in parallel with said inductance winding.

6. The combination of elements as in claim 5 in which said small coupling capacitor is stray wiring capacitance between one end of said diode and the lead to said antenna.

References Cited in the file of this patent

UNITED STATES PATENTS

| | | |
|---|---|---|
| 2,147,595 | Hilferty | Feb. 14, 1939 |
| 2,412,710 | Bradley | Dec. 17, 1946 |
| 2,415,316 | Wheeler | Feb. 4, 1947 |

FOREIGN PATENTS

| | | |
|---|---|---|
| 48,418 | Denmark | Mar. 31, 1933 |

OTHER REFERENCES

"An Examination of Performance Capabilities of Super-regenerative Receivers," by Eltgroth, Tele-Tech Magazine, February 1949, pp. 24–27, 57, and March 1949, pp. 40–43 and 71.